United States Patent
Ogikubo

(10) Patent No.: US 7,633,665 B2
(45) Date of Patent: Dec. 15, 2009

(54) OPTICAL MODULATOR ELEMENT AND IMAGE FORMING APPARATUS

(75) Inventor: Shinya Ogikubo, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 320 days.

(21) Appl. No.: 11/369,718

(22) Filed: Mar. 8, 2006

(65) Prior Publication Data
US 2006/0203265 A1    Sep. 14, 2006

(30) Foreign Application Priority Data
Mar. 10, 2005    (JP)    ............... P.2005-068003

(51) Int. Cl.
*G02B 26/00*    (2006.01)
*G02F 1/00*    (2006.01)
(52) U.S. Cl. ............... 359/237; 359/290; 359/292
(58) Field of Classification Search ............... 359/237, 359/290, 291, 292, 295, 298
See application file for complete search history.

(56) References Cited

U.S. PATENT DOCUMENTS 3,711,199 A * 1/1973 Koizumi ............... 355/57
5,706,067 A * 1/1998 Colgan et al. ............... 349/114
6,762,868 B2 * 7/2004 Liu et al. ............... 359/237
7,164,522 B2 * 1/2007 Kimura et al. ............... 359/290
2006/0119922 A1 * 6/2006 Faase et al. ............... 359/290

FOREIGN PATENT DOCUMENTS

| JP | 09-236907 A | | 9/1997 |
| JP | 2001356282 | * | 6/2000 |
| JP | 2001-356282 A | | 12/2001 |
| JP | 2004-117573 A | | 4/2004 |

OTHER PUBLICATIONS

Japanese Office Action dated Jul. 29, 2009.

* cited by examiner

*Primary Examiner*—Ricky L Mack
*Assistant Examiner*—Brandi Thomas
(74) *Attorney, Agent, or Firm*—Sughrue Mion, PLLC

(57) ABSTRACT

An optical modulator element comprises: a substrate; an obliquely displacing member capable of displacing obliquely, the obliquely displacing member being above the substrate and having at least one opening portion through which a light incident on the substrate from a light source is passed; and an extended portion extended from a surface of the obliquely displacing member to correspond to the opening portion and to block the light incident on the opening portion in answer to a displacement of the obliquely displacing member.

13 Claims, 13 Drawing Sheets

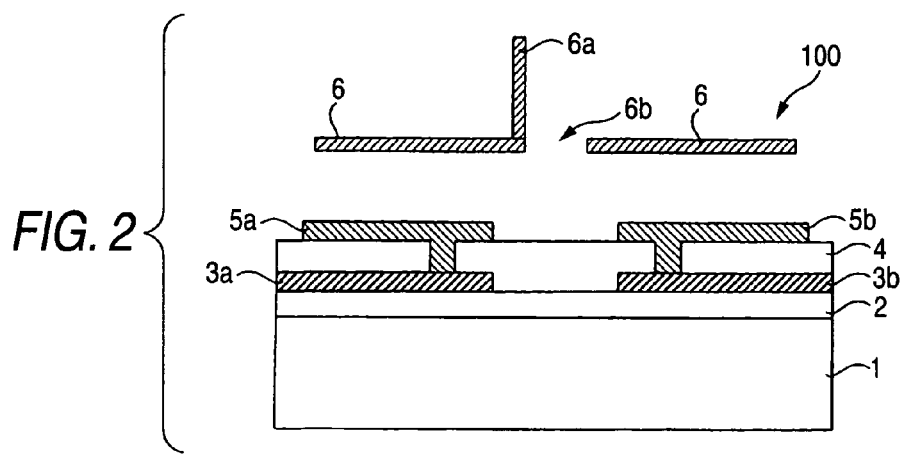
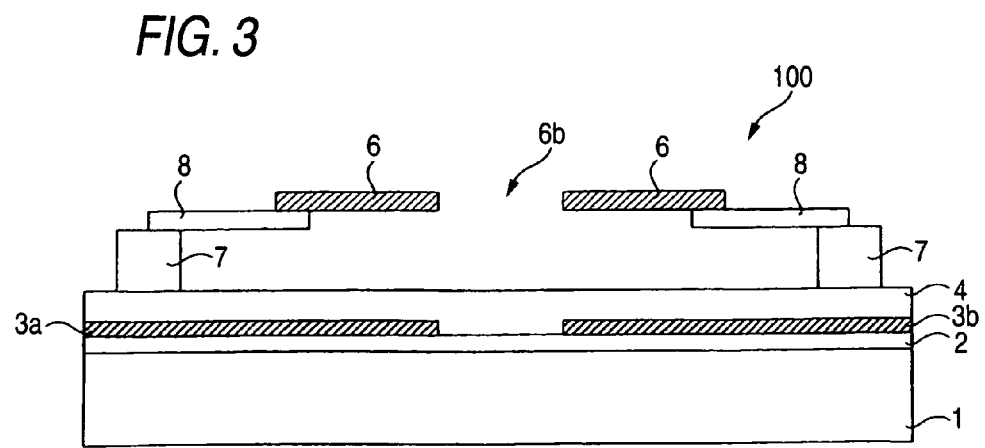

OPTICAL MODULATOR ELEMENT AND IMAGE FORMING APPARATUS

BACKGROUND OF THE INVENTION

1. Field of the Invention

The present invention relates to an optical modulator element having a substrate and an obliquely displacing member provided over the substrate to displace obliquely with respect to the substrate.

2. Description of the Related Art

In the related art, various optical elements have been proposed as the element that switches ON/OFF of the light (optical modulation) (see JP-A-2001-356282, for example). The element set forth in JP-A-2001-356282 is constructed such that the reflecting mirror provided over the substrate can be turned by the motor drive to take its horizontal position and its vertical position with respect to the substrate. When the reflecting mirror is set in its horizontal position, the light incident from obliquely above with respect to the substrate is reflected and emitted to the outside. When the reflecting mirror is set in its vertical position, the light incident from obliquely above with respect to the substrate is reflected to the substrate side and then absorbed by the light absorbing surface formed on the substrate. As a result, the optical switching can be realized.

In the optical element set forth in JP-A-2001-356282, since an incident light and an emergent light are present on the same side of the optical element, the peripheral optical system becomes complicated in structure and thus such element is unsuitable for the miniaturization. In contrast, the transmission optical modulator element in which the incident light and the emergent light are present on the opposite side to put the element between them is known. Therefore, if such element is employed, the miniaturization can be realized.

SUMMARY OF THE INVENTION

It is an object of the present invention to provide a transmission optical modulator element having a new configuration that has not been proposed by various transmission optical modulator elements in the related art.

An optical modulator element of the present invention comprises: a substrate; an obliquely displacing member capable of displacing obliquely, the obliquely displacing member being above the substrate and having at least one opening portion through which a light incident on the substrate from a light source is passed; and an extended portion extended from a surface of the obliquely displacing member to correspond to the opening portion and to block the light incident on the opening portion in answer to a displacement of the obliquely displacing member.

According to this configuration, since the displacement of the obliquely displacing member can be controlled, either the light incident on the substrate is not incident on the extended portion but passed through the opening portion as it is or the light incident on the substrate is incident on the extended portion to change the path of the light or absorb the light. Therefore, the switching of light can be carried out.

In the optical modulator element of the present invention, the extended portion is provided to tilt with respect to an opening plane of the opening portion.

In the optical modulator element of the present invention, the extended portion is provided to perpendicularly to an opening plane of the opening portion.

In the optical modulator element of the present invention, the extended portion comprises a reflecting member.

According to this configuration, when the light incident on the substrate is incident upon the extended portion, the path of the light can be changed.

The optical modulator element of the present invention further comprises a light absorbing portion that absorbs the light reflected by the reflecting member.

According to this configuration, the OFF state in which the light is not emergent on the image forming plane is set when the light is incident on the reflecting member, while the ON state in which the light is emergent on the image forming plane is set when the light is not incident on the reflecting member.

In the optical modulator element of the present invention, the light absorbing portion is provided to a part of the obliquely displacing member.

According to this configuration, there is no need to keep separately a space in which the light absorbing portion is provided. Therefore, the miniaturization of the optical modulator element can be achieved.

According to this configuration, when the light incident on the substrate is incident upon the extended portion, the light can be absorbed. Therefore, the OFF state in which the light is not emergent on the image forming plane is set when the light is incident on the light absorbing member, while the ON state in which the light is emergent on the image forming plane is set when the light is not incident on the light absorbing member.

In the optical modulator element of the present invention, the obliquely displacing member is obliquely displaced by an electrostatic force.

According to this configuration, a high-speed drive of the obliquely displacing member can be attained.

In the optical modulator element of the present invention, the obliquely displacing member is obliquely displaced only in a unilateral direction.

According to this configuration, the drive of the obliquely displacing member can be simplified.

In the optical modulator element of the present invention, the obliquely displacing member is obliquely displaced in bilateral directions.

An image forming apparatus of the present invention, comprises: an optical modulator element array in which the above optical modulator elements are aligned as an array; a light source that emits a light to the optical modulator element array; and a projecting optical system that projects the light emitted from the optical modulator element array onto an image forming plane.

In the image forming apparatus of the present invention, the optical modulator element has only one opening portion, and the image forming apparatus further comprises a microlens array that converges the light from the light source into the opening portion.

BRIEF DESCRIPTION OF THE DRAWINGS

FIG. 2 is a sectional view taken along an A-A line in FIG. 1;

FIG. 3 is a sectional view taken along a B-B line in FIG. 1;

DETAILED DESCRIPTION OF THE INVENTION

Embodiments of the present invention will be explained with reference to the drawings hereinafter.

Figure 1:
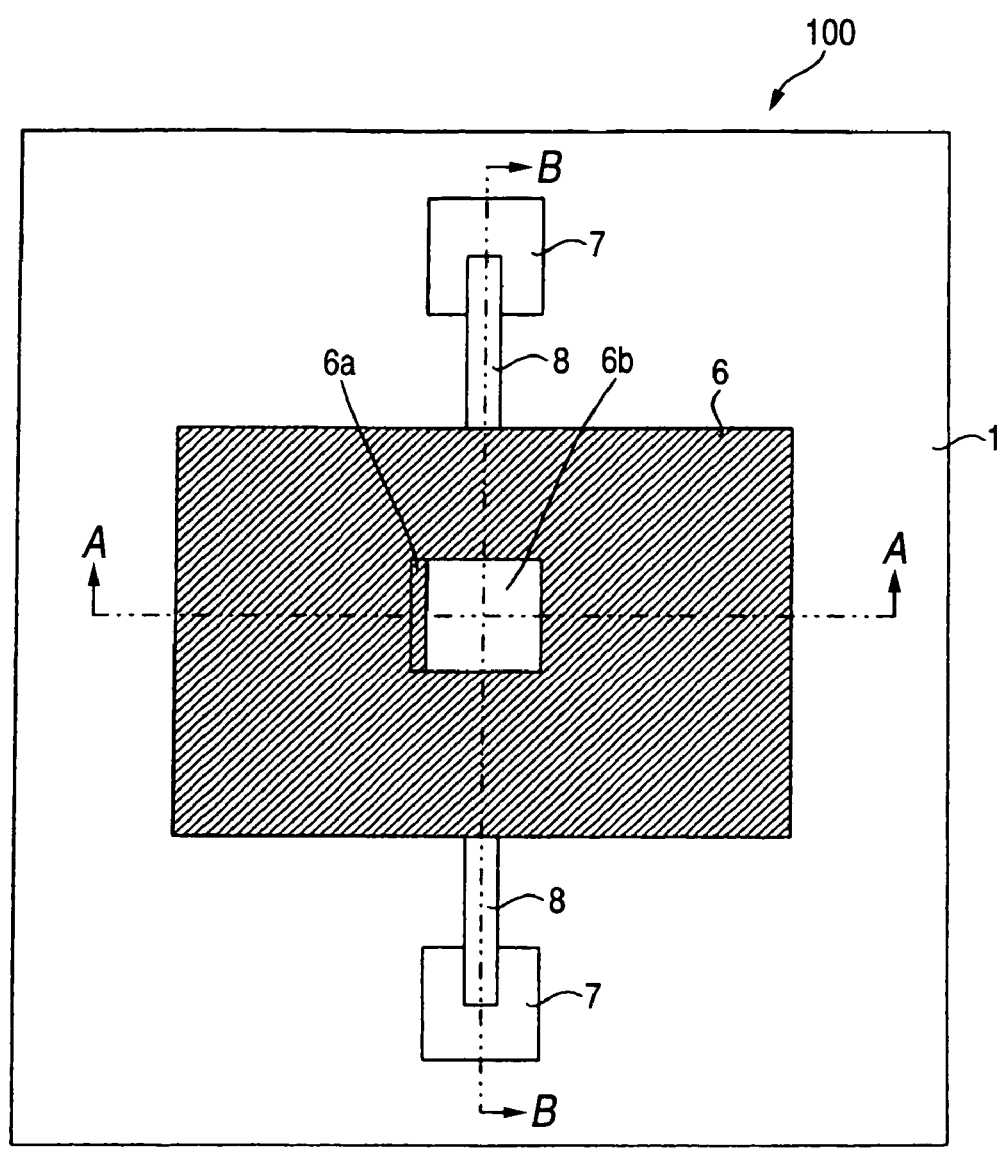
FIG. 1 is a schematic plan view of an optical modulator element to explain a first embodiment of the present invention.

FIG. 1 is a plan view showing a schematic configuration of an optical modulator element to explain a first embodiment of the present invention. FIG. 2 is a sectional view taken along an A-A line in FIG. 1. FIG. 3 is a sectional view taken along a B-B line in FIG. 1. The optical modulator element of the present embodiment is used in the image forming apparatus such as the exposing apparatus, the projecting apparatus, the display apparatus, and the like, and is manufactured by MEMS (Micro Electro Mechanical System), for example.

An optical modulator element 100 includes a flat substrate 1 that is transparent to an incident light, driving circuits 3a, 3b provided on the flat substrate 1 via an insulating layer 2, electrodes 5a, 5b provided on the driving circuits 3a, 3b, an electrode 6 as an obliquely displacing member arranged over the electrodes 5a, 5b at a predetermined interval, hinge portions 8, 8 for supporting turnably the electrode 6, and supporting portions 7, 7 for supporting the hinge portions 8, 8. The electrode 5a is connected to the driving circuit 3a, and a voltage is supplied from the driving circuit 3a. The electrode 5b is connected to the driving circuit 3b, and a voltage is supplied from the driving circuit 3b. The driving circuits 3a, 3b and a part of the electrodes 5a, 5b are embedded in an insulating film 4. Here, assume that a light source is positioned below the flat substrate 1 and an image forming plane is positioned over the flat substrate 1. The "image forming plane" means a plane supposed when the optical modulator element 100 is used in the image forming apparatus. Also, a recording material plane when the optical modulator element 100 is used in the exposing apparatus, and a projector plane (screen) is supposed when the optical modulator element 100 is used in the projector, for example. As the light source explained in the present embodiment, any light source such as the laser, LED, or the like, which is employed commonly in the image forming apparatus, may be employed.

The electrode 6 is turned around the hinge portions 8, 8 by an electrostatic force, which is generated when a voltage is applied to the electrode 5a or 5b and the electrode 6, in the direction along which the electrostatic force acts. Thus, the electrode 6 can be displaced obliquely with respect to the flat substrate 1. When no voltage is applied to the electrode 5a or 5b and the electrode 6, the electrode 6 is positioned in parallel with the flat substrate 1. The voltage is applied to the electrode 6 by a driver (not shown).

An opening portion 6b having a square shape, for example, is formed in the electrode 6 to pass a light that is incident from the light source located below the flat substrate 1. Also, a reflecting mirror 6a is provided to the electrode 6 perpendicularly to an opening area of the opening portion 6b to extend from a surface along one side of the opening portion 6b. The reflecting mirror 6a has a function of blocking the light that is incident on the opening portion 6b in a situation that the electrode 6 is tilted rightward when the voltage is applied to the electrode 6 and the electrode 5b.

Next, an operation of the optical modulator element 100 will be explained hereunder.

Figure 4A:
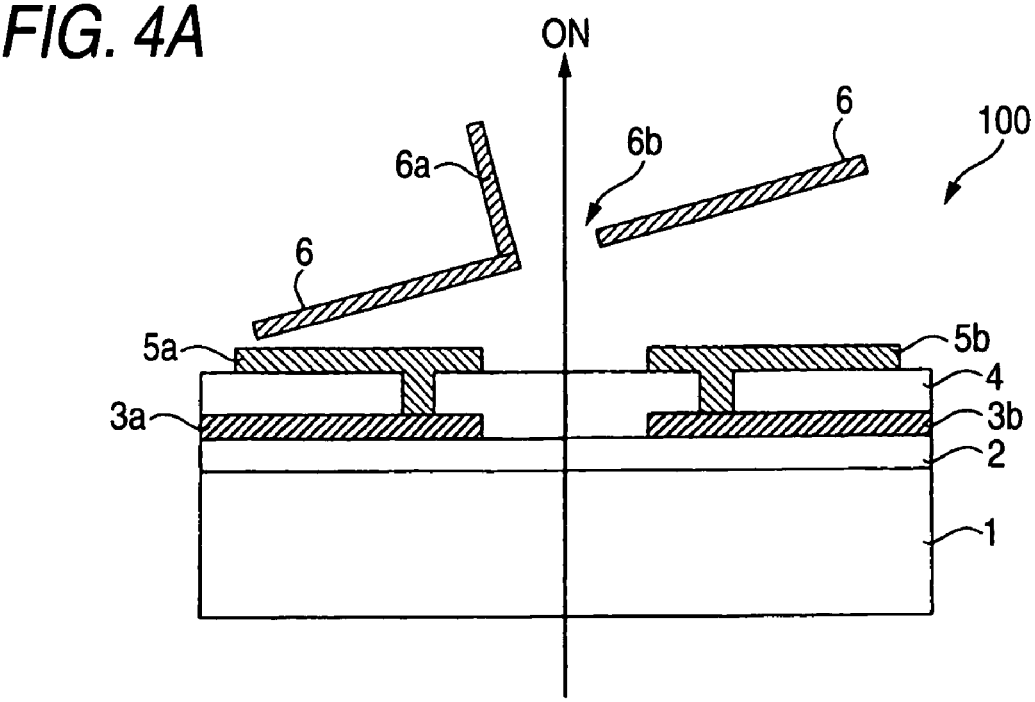
FIGS. 4A and 4B are views explaining an operation of the optical modulator element to explain the first embodiment of the present invention.
Figure 4B:
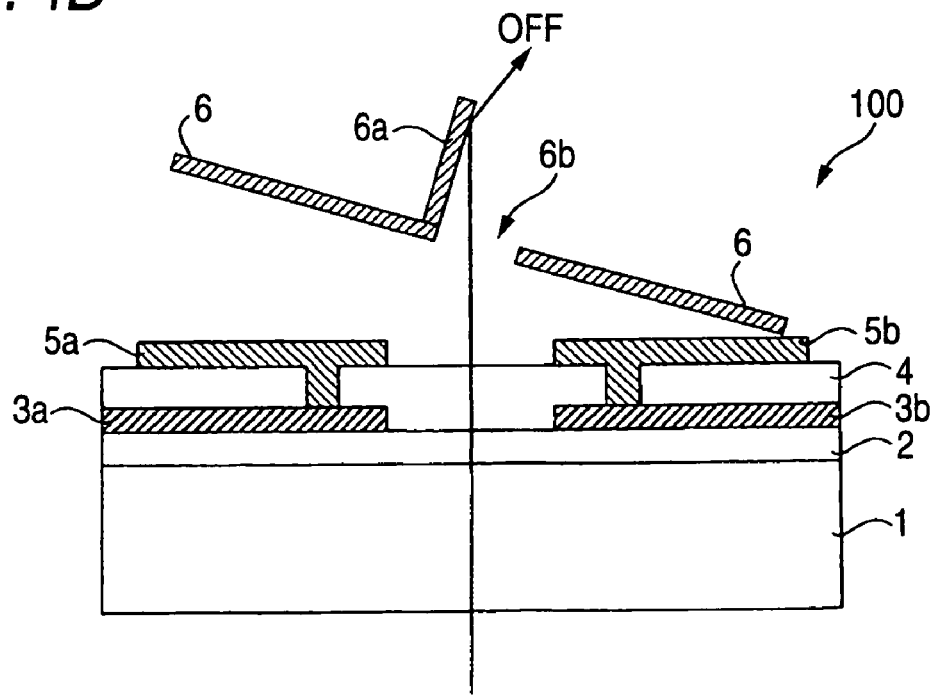

In the optical modulator element 100, as shown in FIG. 4A, when the voltage is applied to the electrode 6 and the electrode 5a, the electrode 6 is tilted leftward by the electrostatic force generated between the electrode 6 and the electrode 5a. In this state, since the light from the light source can pass through the opening portion 6b, such light is emitted on the image forming plane. Here, a state in which the light from the light source is emergent onto the image forming plane is referred to as an ON state of the optical modulator element 100, and also the light that is emergent onto the image forming plane in the ON state is referred to as an ON light. In contrast, as shown in FIG. 4B, when the voltage is applied to the electrode 6 and the electrode 5b, the electrode 6 is tilted rightward by the electrostatic force generated between the electrode 6 and the electrode 5b. In this state, since the light from the light source is passed through the opening portion 6b and then blocked by the reflecting mirror 6a, such light is reflected by the reflecting mirror 6a and absorbed by the light absorbing member (not shown) provided to the optical modulator element 100. Thus, the light is not emitted onto the image forming plane. Here, a state in which the light from the light source is not emergent onto the image forming plane is referred to as an OFF state of the optical modulator element 100, and also the light that is not emergent onto the image forming plane is referred to as an OFF light.

In this manner, according to the optical modulator element 100, the optical modulation can be carried out by a simple structure in which the opening portion 6b is provided in the electrode 6 and then the reflecting mirror 6a is provided to the surface of the electrode 6. Also, because the optical modulator element 100 has a simple structure, the high-speed driving and the miniaturization can be facilitated. Also, because the optical modulator element 100 is a transmission type, a configuration of the image forming apparatus using this optical modulator element can be made simple. Also, according to the optical modulator element 100, the light from the light source is passed through the opening portion 6b in the ON state and is emergent onto the image forming plane, and therefore the element having a light utilization efficiency of 100% can be accomplished. The normal reflection optical modulator element reflects the incident light toward the emergent portion or the light absorbing member by displacing the reflecting mirror provided to the movable portion, and thus switches the ON state and the OFF state. According to this approach, when the reflecting mirror is angled by bringing the movable portion into contact with the substrate, a vibration of the reflecting mirror is generated in reaction. Thus, such a problem exists that the ON light emitted after the reflection is also vibrated. Also, in the normal transmission optical modulator element, design and drive of the movable portion must be adjusted according to the wavelength of light emitted from the light source. However, according to the optical modulator element 100, the problem such that the ON light is vibrated does not occur because the light passes through the opening portion 6b, and design and drive can be carried out irrespective of the wavelength of light emitted from the light source.

Figure 5:
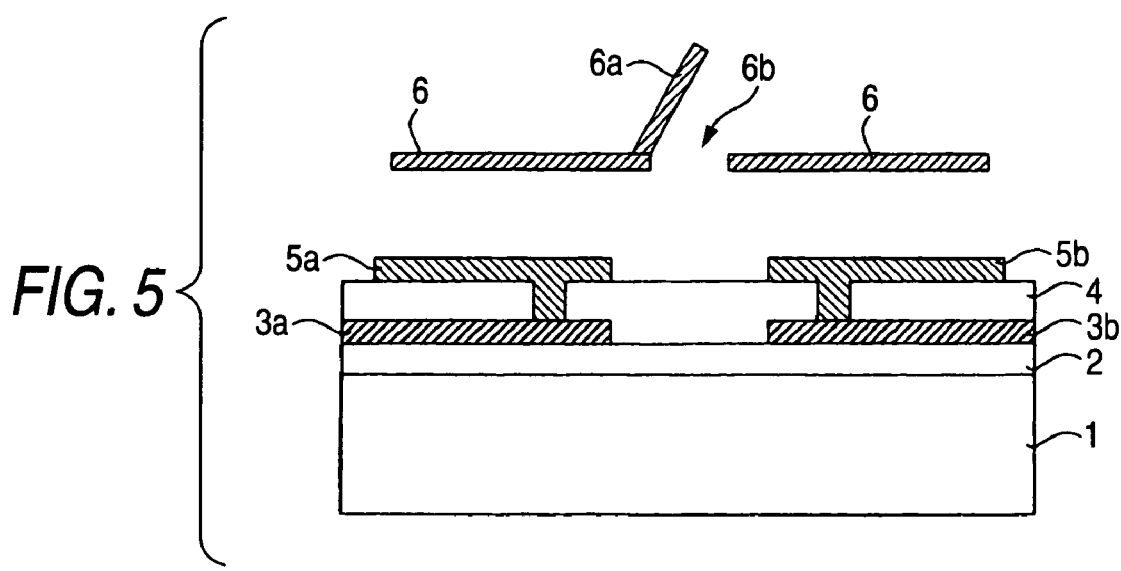
FIG. 5 is a schematic sectional view showing a variation of the optical modulator element to explain the first embodiment of the present invention.
Figure 6:
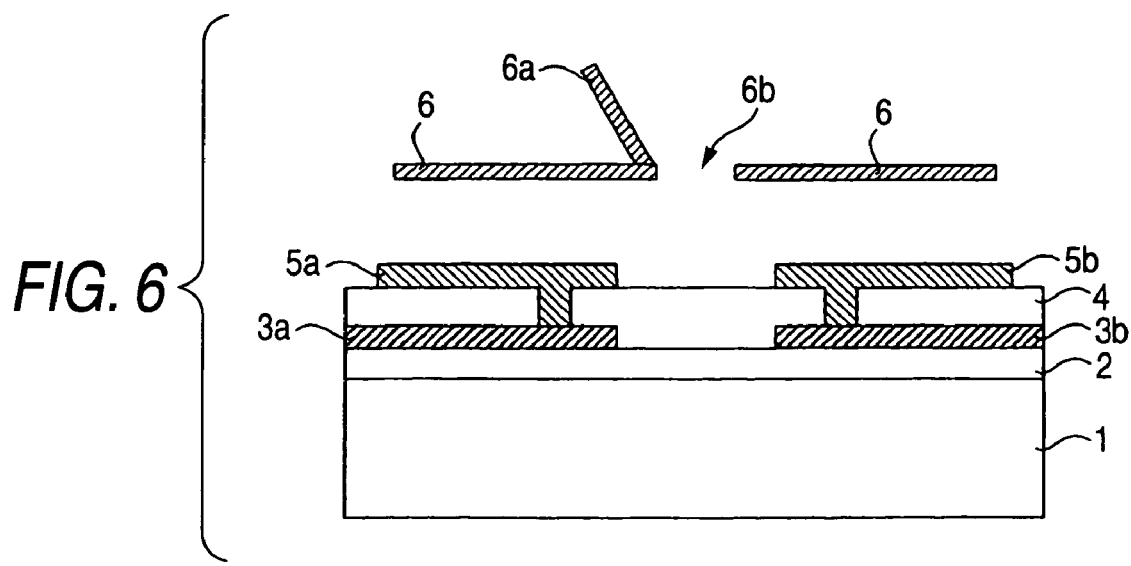
FIG. 6 is a schematic sectional view showing the variation of the optical modulator element to explain the first embodiment of the present invention.

In this case, if the reflecting mirror 6a can block the light that is incident on the opening portion 6b in a state that the electrode 6 is set in a predetermined position (a state in FIG. 4B, for example), a position on a surface of the electrode 6, a height from the surface, a width, a shape, and the like of the reflecting mirror 6a are not particularly limited. For example, as shown in FIG. 5 and FIG. 6, the reflecting mirror 6a may be constructed to tilt at an angle except a right angle to the opening surface of the opening portion 6b. According to the structure shown in FIG. 5, if a state in which the electrode 6 is positioned in parallel with the flat substrate 1 is set to the OFF state and also a state in which the electrode 6 is tilted leftward is set to the ON state, the optical modulation can be realized. Also, according to the structure shown in FIG. 5, even when the light is incident right-upward from the lower side of the flat substrate 1, the optical modulation can also be realized if a state in which the electrode 6 is positioned in parallel with the flat substrate 1 is set to the ON state and also a state in which the electrode 6 is tilted rightward is set to the OFF state, for example. According to the structure shown in FIG. 6, even when the light is incident left-upward from the lower side of the flat substrate 1, the optical modulation can also be realized if a state in which the electrode 6 is positioned in parallel with the flat substrate 1 is set to the ON state and also a state in which the electrode 6 is tilted rightward is set to the OFF state, for example.

In FIG. 1 to FIG. 3, the configuration in which the optical modulation is executed by causing the electrode 6 to tilt rightward and leftward (bilaterally) is employed. In this case, as shown in FIG. 7 and FIG. 8, for example, the configuration in which the optical modulation is executed by causing the electrode 6 to tilt rightward or leftward only (unilaterally) may be employed.

Figure 7:
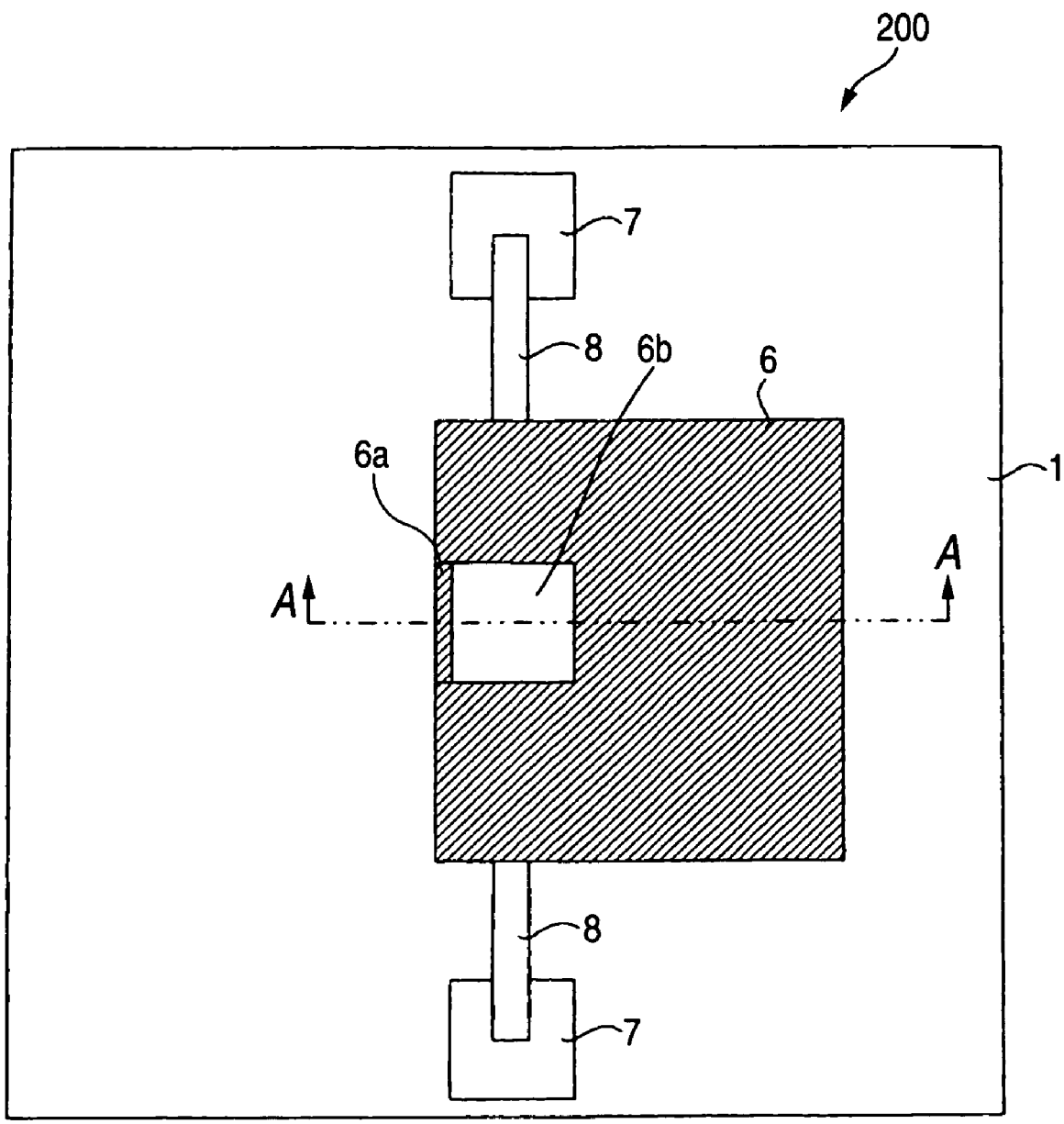
FIG. 7 is a schematic plan view showing the variation of the optical modulator element to explain the first embodiment of the present invention.
Figure 8:
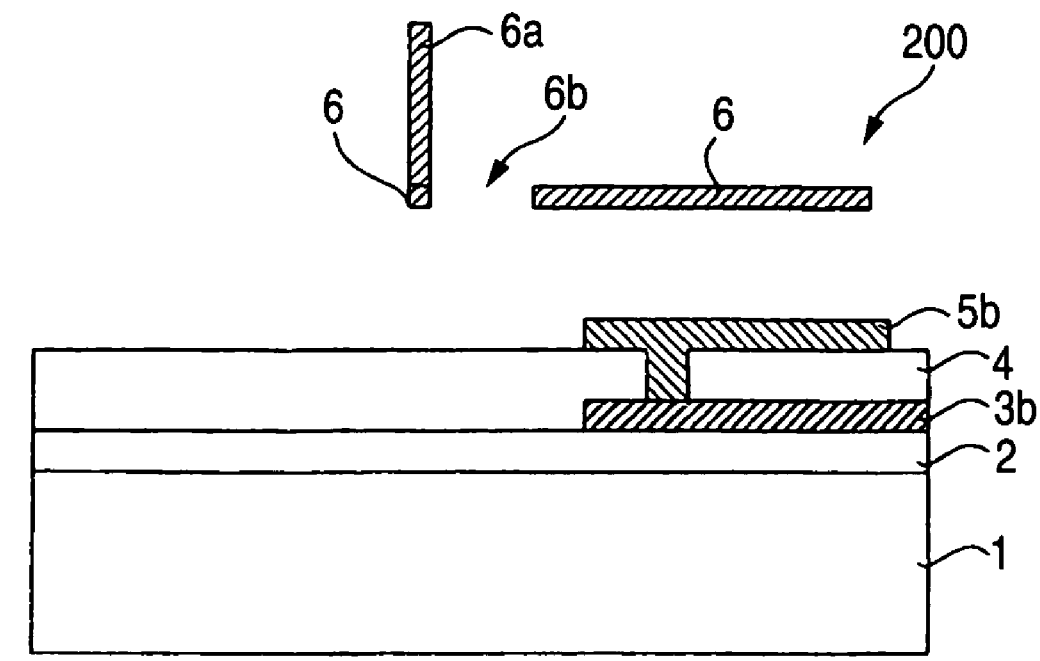
FIG. 8 is a sectional view taken along an A-A line in FIG. 1.

FIG. 7 is a schematic plan view showing the variation of the optical modulator element to explain the first embodiment of the present invention. FIG. 8 is a sectional view taken along an A-A line in FIG. 7. In FIG. 7 and FIG. 8, the same reference symbols are affixed to the same elements as those in FIG. 1 to FIG. 3.

Figure 9A:
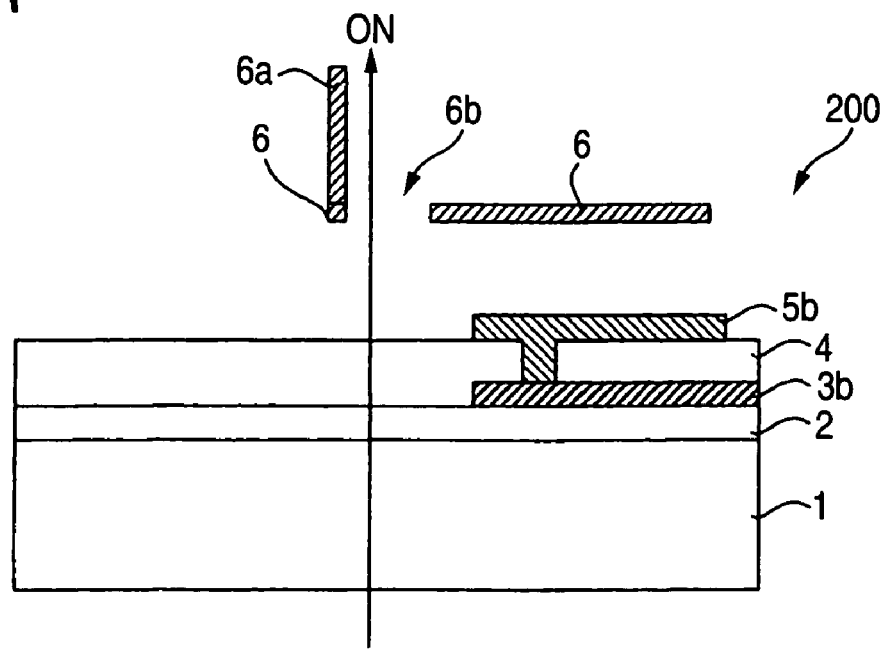
FIGS. 9A and 9B are views explaining an operation of the optical modulator element shown in FIG. 7.
Figure 9B:
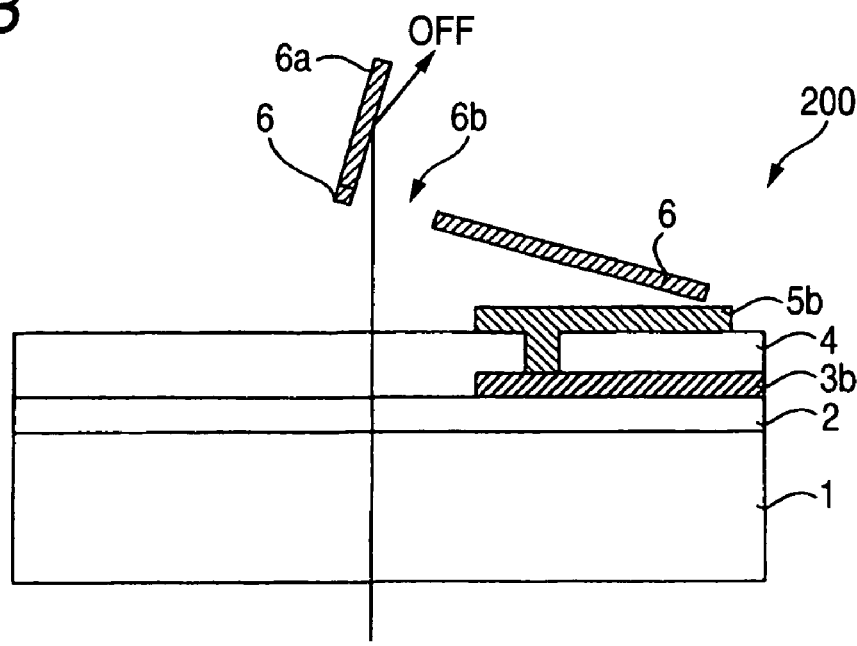

An optical modulator element 200 has the similar configuration to that shown in FIG. 1 except that the left side is omitted from the surface, to which the reflecting mirror 6a of the electrode 6 is provided, and also the driving circuit 3a and the electrode 5a are omitted. In the optical modulator element 200, as shown in FIG. 9A, when no voltage is applied to the electrode 6 and the electrode 5b, the electrode 6 is set in parallel with the flat substrate 1. In this state, since the light emitted from the light source can pass through the opening portion 6b, such light is emergent on the image forming plane. In contrast, as shown in FIG. 9B, when the voltage is applied to the electrode 6 and the electrode 5b, the electrode 6 is tilted rightward by the electrostatic force generated between the electrode 6 and the electrode 5b. In this state, the light from the light source is blocked by the reflecting mirror 6a after such light passed through the opening portion 6b. Therefore, this light is reflected by the reflecting mirror 6a and then absorbed by the light absorbing member (not shown) provided to the optical modulator element 200, and thus is not emitted onto the image forming plane. In this manner, according to the configuration of the optical modulator element 200, the optical modulation can be carried out by switching the ON state and the OFF state.

Also, in FIG. 1 to FIG. 3, the light source is positioned below the flat substrate 1 and the image forming plane is positioned over the flat substrate 1. In this case, the optical modulation can be carried out if the light source is positioned over the flat substrate 1 and the image forming plane is positioned below the flat substrate 1. In such case, the optical modulator element may be constructed as shown in FIGS. 10A and 10B or FIGS. 11A and 11B.

Figure 10A:
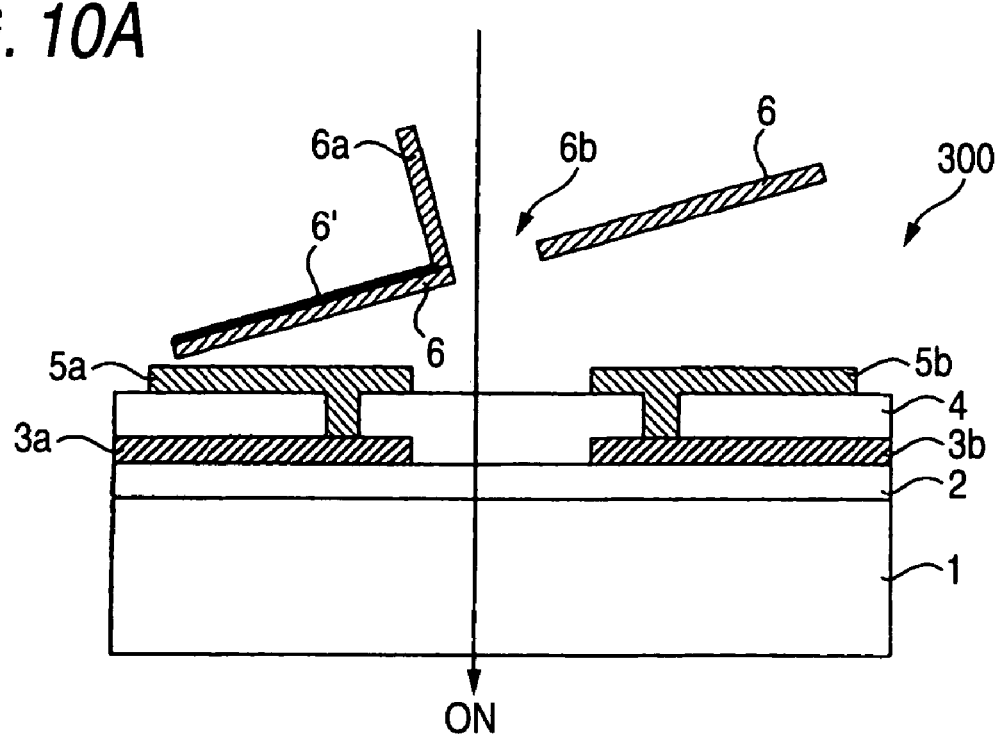
FIGS. 10A and 10B are schematic sectional views showing another variation of the optical modulator element to explain the first embodiment of the present invention.
Figure 10B:
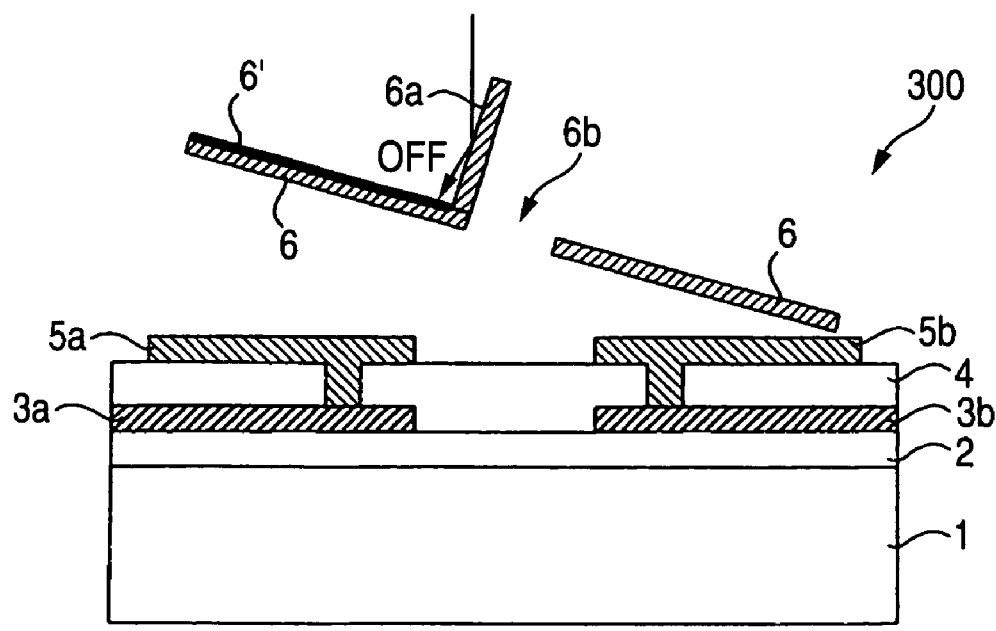

An optical modulator element 300 shown in FIGS. 10A and 10B has the same configuration as that shown in FIG. 2, except that a light absorbing film 6' as the light absorbing member for absorbing the light is coated on the surface of the left portion rather than the opening portion 6b of the electrode 6.

In the optical modulator element 300, as shown in FIG. 10A, when the voltage is applied to the electrode 6 and the electrode 5a, the electrode 6 is tilted leftward by the electrostatic force generated between the electrode 6 and the electrode 5a. In this state, since the light from the light source can pass through the opening portion 6b, such light is emergent onto the image forming plane. In contrast, as shown in FIG. 10B, when the voltage is applied to the electrode 6 and the electrode 5b, the electrode 6 is tilted rightward by the electrostatic force generated between the electrode 6 and the electrode 5b. In this state, since the light from the light source is blocked by the reflecting mirror 6a before such light passes through the opening portion 6b, this light is reflected by the reflecting mirror 6a and then absorbed by the light absorbing film 6' coated on the electrode 6, and thus is not emitted onto the image forming plane. In this manner, according to the optical modulator element 300, since the electrode 6 performs both a function as the obliquely displacing member and a function as the light absorbing member, there is no need to keep separately a space used to provide the light absorbing member, and thus the optical modulator element can be reduced in size.

Figure 11A:
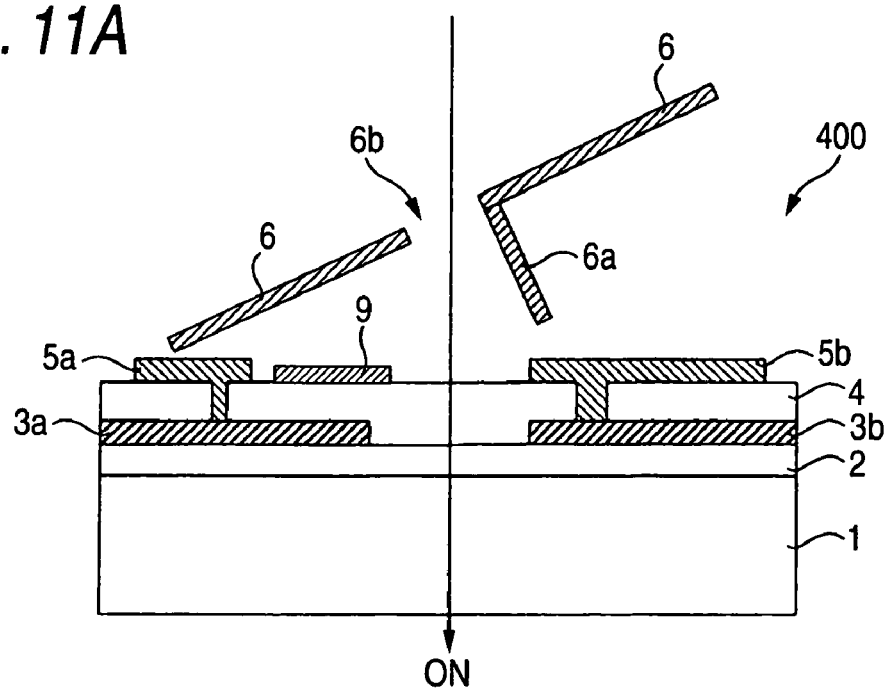
FIGS. 11A and 11B are schematic sectional views showing another variation of the optical modulator element to explain the first embodiment of the present invention.
Figure 11B:
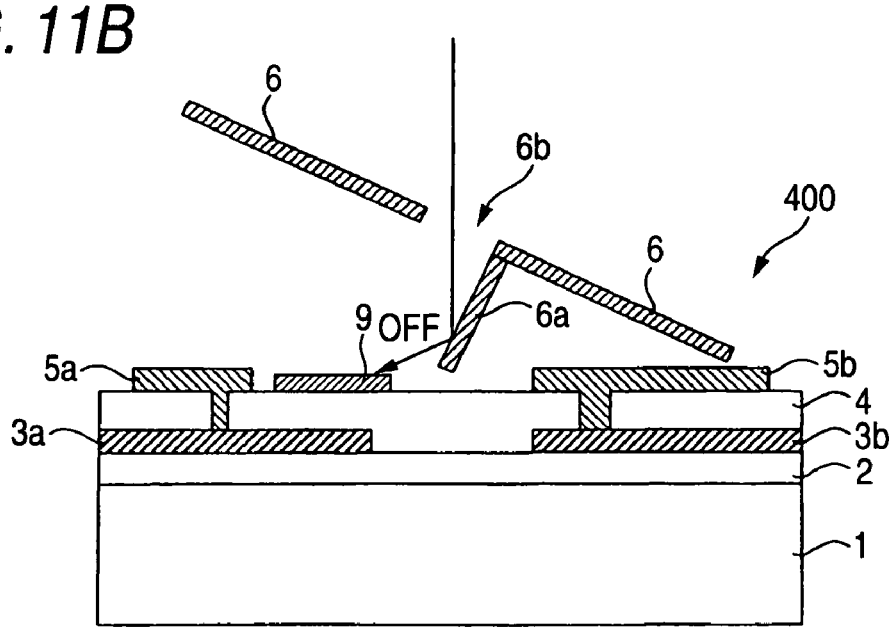

An optical modulator element 400 shown in FIGS. 11A and 11B has the same configuration as that shown in FIG. 2, except that a light absorbing film 9 is provided on the insulating film 4 and an arranging position of the reflecting mirror 6a is changed.

In the optical modulator element 400, as shown in FIG. 11A, when the voltage is applied to the electrode 6 and the electrode 5a, the electrode 6 is tilted leftward by the electrostatic force generated between the electrode 6 and the electrode 5a. In this state, since the light from the light source can pass through the opening portion 6b, such light is emergent onto the image forming plane. In contrast, as shown in FIG. 11B, when the voltage is applied to the electrode 6 and the electrode 5b, the electrode 6 is tilted rightward by the electrostatic force generated between the electrode 6 and the electrode 5b. In this state, since the light from the light source is blocked by the reflecting mirror 6a after such light passed through the opening portion 6b, this light is reflected by the reflecting mirror 6a and then absorbed by the light absorbing film 9 provided onto the insulating film 4, and thus is not emitted onto the image forming plane.

In the above, such a configuration is employed that only one opening portion 6b is provided in the electrode 6. But this configuration is employed on the assumption that the light from the light source is converged to the opening portion 6b by the microlens, or the like. It is preferable that, when the light from the light source is incident on the overall surface of the electrode 6, a plurality of opening portions 6b should be provided to increase a quantity of passing light in the ON state. In this case, if one extended portion is provided to correspond to one opening portion 6b, the optical modulation can be carried out satisfactorily. In this event, the opening portions 6b may be provided in the areas that are do not overlap with the driving circuits 3a, 3b and the electrodes 5a, 5b when the electrode 6 that is positioned in parallel with the flat substrate 1 is viewed from the upper side. In case the transparent electrodes are employed as the electrodes 5a, 5b, the opening portions 6b may be provided in the areas that are do not overlap with the driving circuits 3a, 3b.

In the above, the electrode 6 is obliquely displaced by the electrostatic force. But such a configuration may be employed that the electrode 6 is obliquely displaced by an electromagnetic force or a piezoelectric force.

Next, a configuration of one pixel of the image forming apparatus using the above optical modulator element will be explained hereunder. The projecting apparatus will be explained as an example of the image forming apparatus hereunder.

Figure 12:
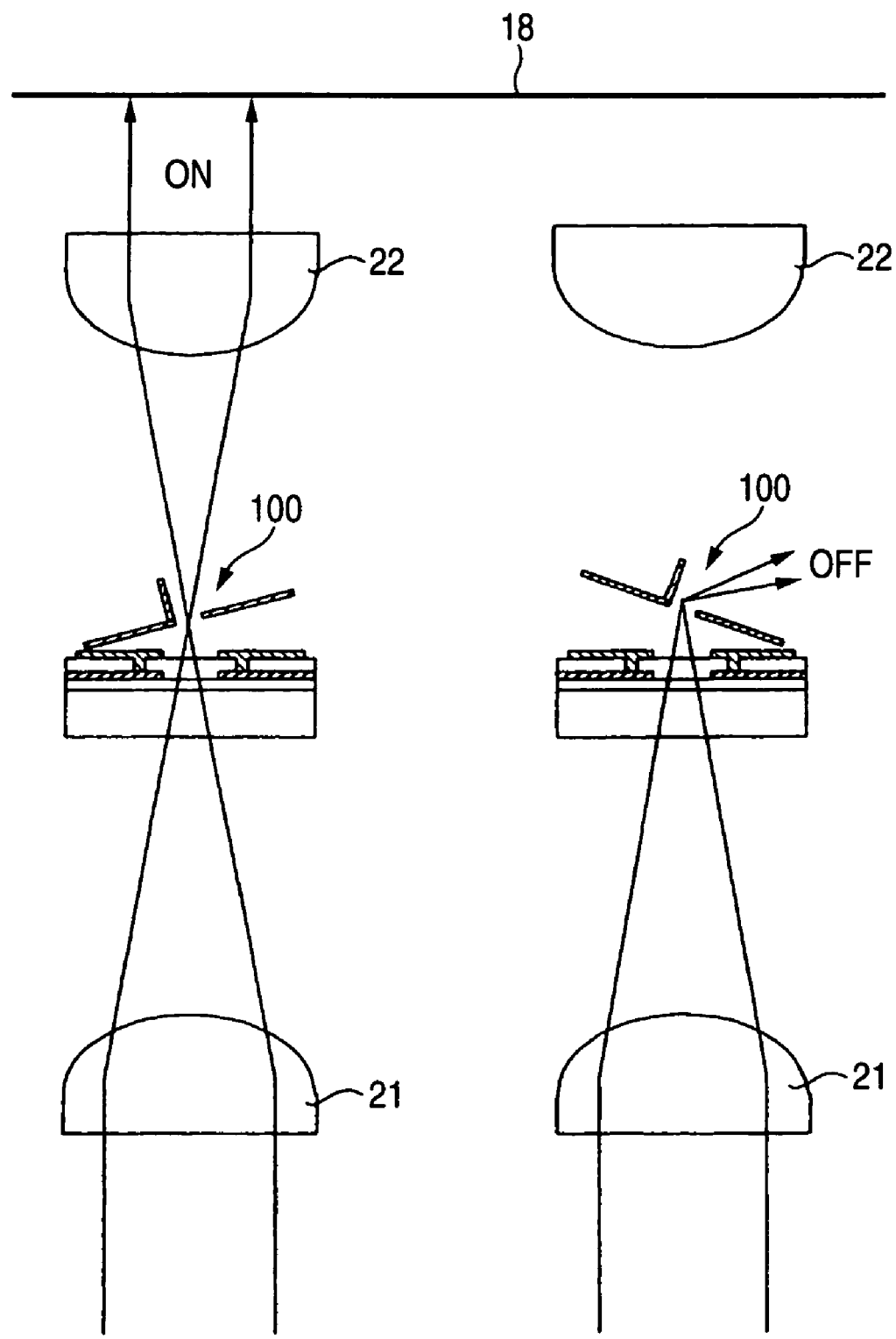
FIG. 12 is a schematic configurative view of one pixel portion of a projecting apparatus into which the optical modulator element to explain the first embodiment of the present invention is employed.

FIG. 12 is a view showing a schematic configuration of one pixel portion of the projecting apparatus to explain the first embodiment of the present invention. An example using the optical modulator element 100 as the optical modulator element is shown in FIG. 12.

One pixel of the projecting apparatus shown in FIG. 12 has a microlens 21 for converging the light from the light source to the opening portion 6b of the optical modulator element 100, the optical modulator element 100, a microlens 22 for diverging the ON light from the optical modulator element 100. The microlens 22 is the optical system for the projecting apparatus that projects the light onto a screen 18 as the image forming plane.

An operation of the projecting apparatus shown in FIG. 12 will be explained hereunder.

The light from the light source is converged to the opening portion 6b of the optical modulator element 100 by the microlens 21. The optical modulator element 100 takes either of its ON state and its OFF state in response to the image signal. The ON light emergent from the optical modulator element 100 is projected/exposed onto the screen 18 by the microlens 22 (the left portion of FIG. 12). The OFF light emergent from the optical modulator element 100 is absorbed by the light absorbing film (the right portion of FIG. 12), and is not projected onto the screen 18. In this manner, the optical modulation can be carried out.

Next, the steps of manufacturing the optical modulator element 100 shown in FIG. 1 to FIG. 3 will be explained hereunder.

FIGS. 13A to 13D and FIGS. 14E to 14G are views explaining the steps of manufacturing the optical modulator element 100, and show respective states in the sectional view taken along an A-A line in FIG. 1 after respective steps.

First, the driving circuits 3a, 3b made of CMOS are formed on the transparent flat substrate 1 made of glass or quartz via the insulating film 2. This formation of the driving circuits 3a, 3b on the flat substrate 1 can be attained by either the method of forming the driving circuits 3a, 3b on the SOI (Silicon On Insulator) substrate, then releasing the Si substrate from the insulating layer 2 under the driving circuits 3a, 3b, and then substituting the flat substrate 1 by the transferring process, or the like or the method of forming directly the TFT (Thin Film Transistor) as the driving circuits 3a, 3b onto the flat substrate 1.

Figure 13A:
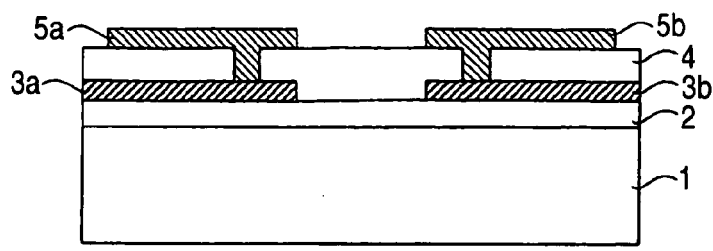
FIGS. 13A to 13D are sectional views explaining the steps of manufacturing the optical modulator element to explain the first embodiment of the present invention.

Then, the insulating layer 4 is formed by forming $SiO_2$ on the driving circuits 3a, 3b by means of the PECVD method. Then, contact holes for connecting outputs of the electrodes 5a, 5b and the driving circuits 3a, 3b formed by the post step are formed by patterning the insulating layer 4 by means of the photolithography and the fluorine-based RIE etching. Then, an underlying TiN thin film is formed by the sputter and in turn tungsten W is formed by the sputter. Accordingly, the tungsten W is buried in the contact holes. Then, the surface of the insulating layer 4 is planarized by CMP, and thus the flat insulating layer 4 in which the contact holes are filled with W is formed. The electrodes 5a, 5b are formed by forming an Al film (preferably an Al alloy film containing a refractory metal) as a first conductive film on the insulating layer 4 by the sputter and then patterning the Al film into a desired electrode shape by means of the photolithography and the fluorine-based RIE etching (FIG. 13A). At this time, the electrodes 5a, 5b are connected to the outputs of the driving circuits 3a, 3b via the contact holes, and a potential is supplied to the electrodes 5a, 5b respectively.

Figure 13B:
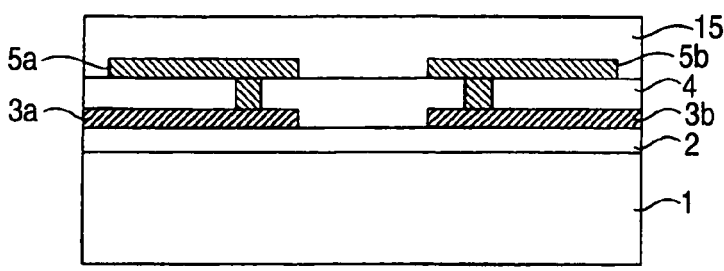

Then, a positive resist film 15 as a sacrifice layer is coated (FIG. 13B). Then, portions of the film acting as the supporting portion 7 are patterned by the photolithography, and the hard baking is applied thereto. The hard baking is executed at a temperature in excess of 200° C. while irradiating the Deep UV. Therefore, its shape of the portions can be kept in the high-temperature process as the post step or the portions are insoluble in the resist removing solvent. The surface of the resist becomes flat by the resist coating film regardless of a level difference of the underlying film. This resist film 15 functions as the sacrifice layer and removed by the later step. As a result, a film thickness of the resist film after the hard baking decides a feature clearance between the electrodes 5a, 5b and the electrode 6.

Then, a second conductive film made of Al (preferably Al alloy film containing the refractory metal) is formed by the sputter, then an $SiO_2$ film is formed thereon by PECVD, then a positive resist film is coated thereon, and locations serving as the hinge portions 8 and the supporting portions 7 are patterned as a mask by the photolithography and the fluorine-based RIE etching. Then, the resist is removed by the oxygen-based plasma etching (ashing).

Figure 13C:
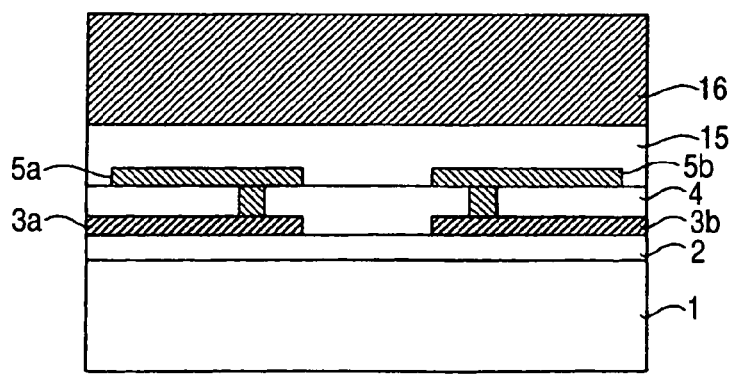

Then, a third conductive film 16 made of Al (or Al alloy) is formed up to a height of the reflecting mirror 6a by the sputter (FIG. 13C).

Figure 13D:
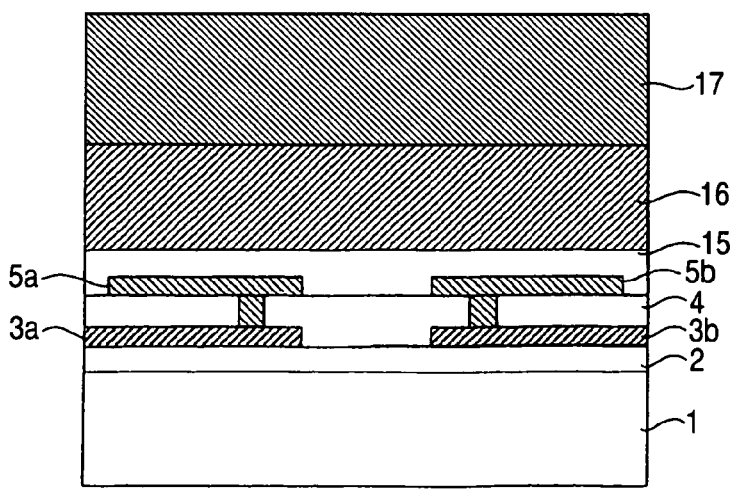

Then, a positive resist film 17 is coated up to a desired film thickness in view of the height of the reflecting mirror 6a and an etching rate of the positive resist (FIG. 13D).

Figure 14E:
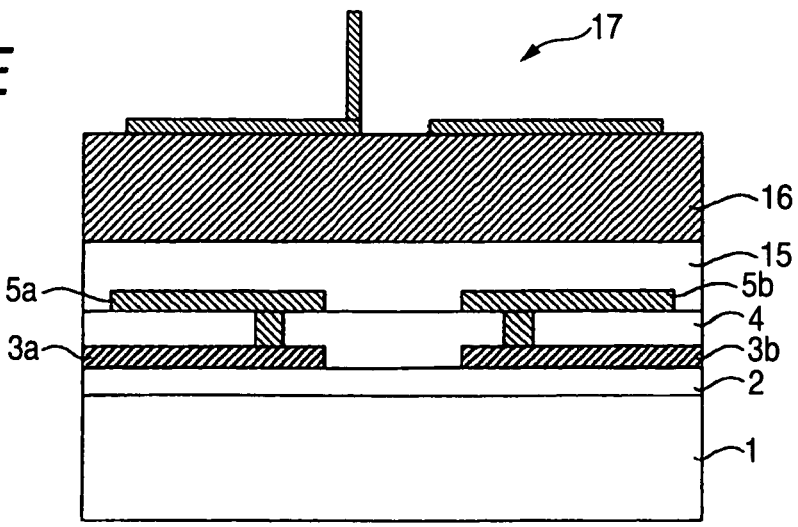
FIGS. 14E to 14G are sectional views explaining the steps of manufacturing the optical modulator element to explain the first embodiment of the present invention.

Then, the positive resist film 17 is patterned in desired shapes (shapes of the electrode 6, the reflecting mirror 6a, and the opening portion 6b shown in FIG. 1) by the photolithography using a gray-scale photo mask (FIG. 14E).

Figure 14F:
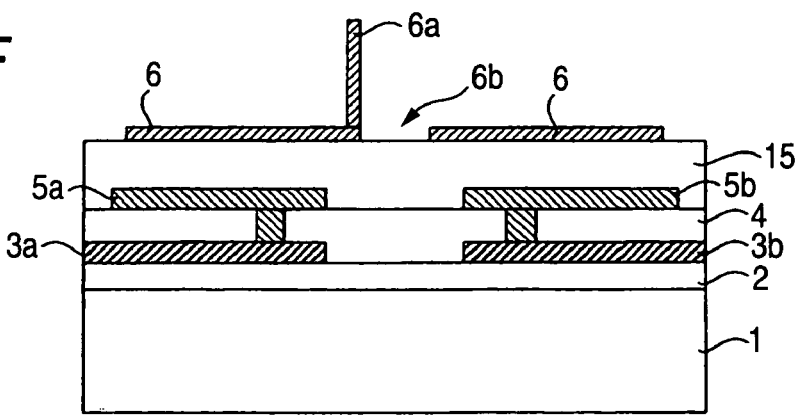

Then, the patterned positive resist film 17 is transferred onto the third conductive film 16 by the chlorine-based RIE etching, and thus the electrode 6, the reflecting mirror 6a, and the opening portion 6b are formed (FIG. 14F).

Figure 14G:
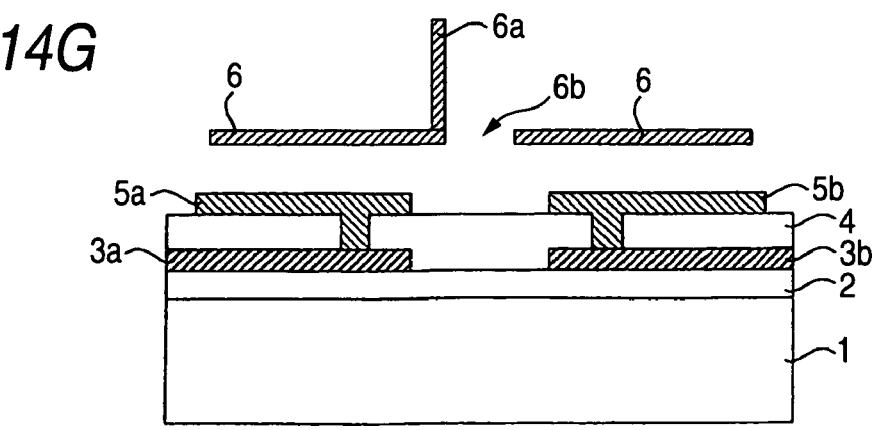

Finally, the sacrifice layer 15 and the $SiO_2$ as the hinge mask are removed the oxygen-based and/or fluorine-based plasma etching (ashing), and thus a clearance is formed (FIG. 14G). As a result, the optical modulator element 100 is formed.

Here, the above material and manufacturing steps are given as an example respectively. Any material and manufacturing steps may be employed if they can accord with the aim of the present invention.

Second Embodiment

In the present embodiment, the image forming apparatus using an optical modulator element array, in which a plurality of optical modulator elements explained in the first embodiment are arranged two-dimensionally on the same plane, will be explained hereunder. The projecting apparatus will be explained hereunder as an example of the image forming apparatus.

Figure 15:
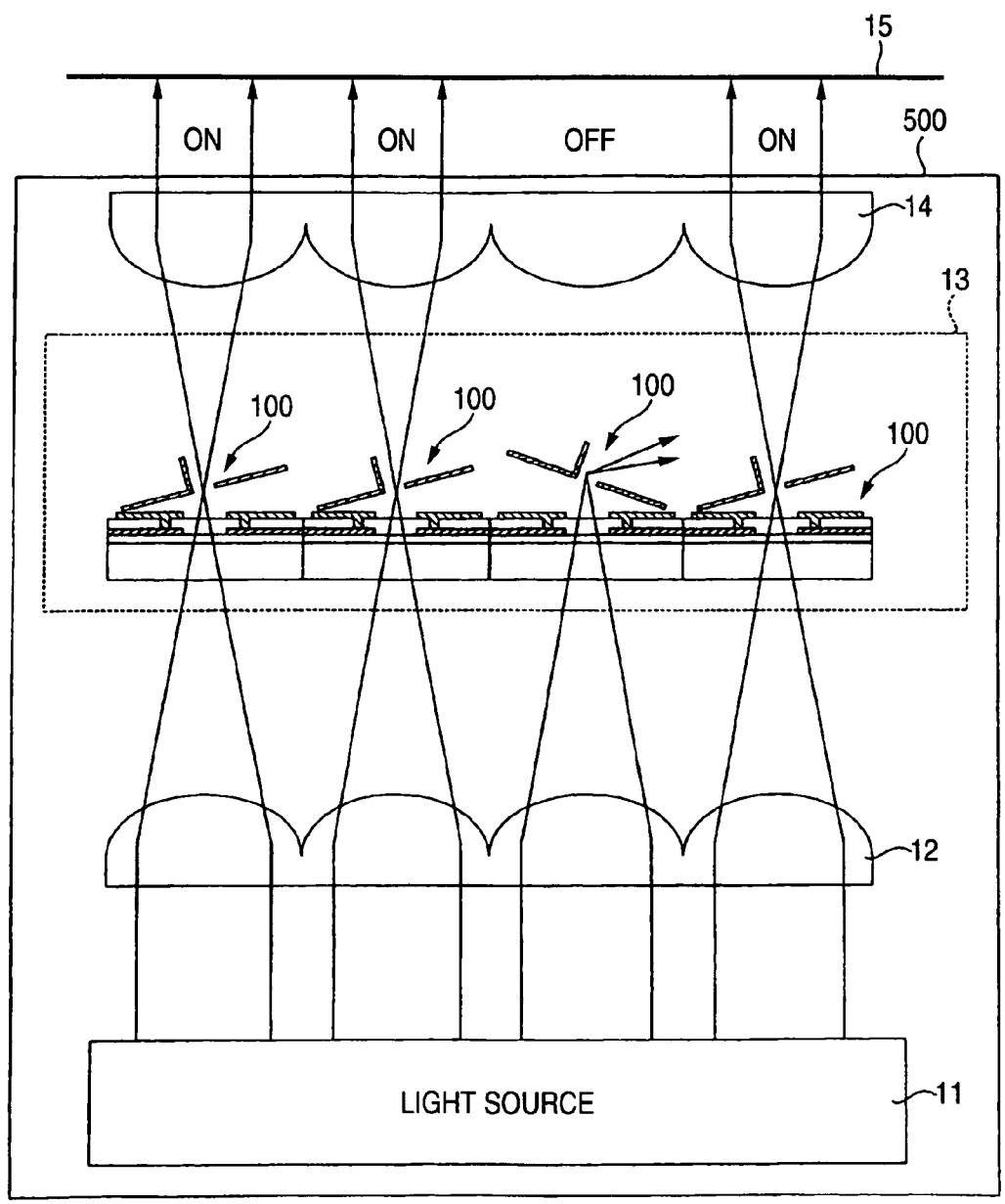
FIG. 15 is a schematic configurative view of a projecting apparatus explaining a second embodiment of the present invention.

FIG. 15 is a view showing a schematic configuration of the projecting apparatus explaining a second embodiment of the present invention.

A projecting apparatus 500 includes a surface light source 11, a microlens array 12, an optical modulator element array 13 in which a plurality of optical modulator elements explained in the first embodiment (here, the optical modulator elements 100 shown in FIG. 1 to FIG. 3) are arranged two-dimensionally on the same plane, and a microlens array 14.

The microlens array 12 consists of the micro lenses of the same number as the optical modulator elements 100 contained in the optical modulator element array 13. Each microlens converges the light from the surface light source 11 into the opening portion 6b of the corresponding optical modulator element 100.

The microlens array 14 is the optical system for the projecting apparatus that projects the light onto the screen 18 as the image forming plane. The microlens array 14 consists of the microlenses, the number of which corresponds to the optical modulator elements 100 contained in the optical modulator element array 13. Each microlens diverges the ON light fed from the corresponding optical modulator element 100.

An operation of the projecting apparatus 500 will be explained hereunder.

The light from the surface light source 11 is converged into the opening portions 6b of the optical modulator element 100 by the microlens array 12. Each optical modulator element 100 in the optical modulator element array 13 takes either of the ON state and the OFF state in response to the image signal. Then, the ON light emitted from the optical modulator element array 13 is projected/exposed onto the screen 18 by the microlens array 14. In this way, a configuration of the projecting apparatus can be made simple by employing the optical modulator element 100 as the projecting apparatus.

In the configuration shown in FIG. 15, when the element shown in FIGS. 10A and 10B or FIGS. 11A and 11B is employed as the optical modulator element 100, the optical modulator element array must be arranged to direct the flat substrate 1 to the microlens array 14 side. Also, when the element to which plural opening portions 6b and corresponding extended portions 6a are provided is employed as the optical modulator element 100, the microlens array 12 may be omitted.

According to the present invention, a transmission optical modulator element having a new configuration that has not been proposed in the related art can be provided.

The entire disclosure of each and every foreign patent application from which the benefit of foreign priority has been claimed in the present application is incorporated herein by reference, as if fully set forth.

What is claimed is:

1. An optical modulator element comprising:
a substrate;
an obliquely displacing member capable of displacing obliquely, the obliquely displacing member being above the substrate and comprising:
at least one opening portion through which a light incident on the substrate from a light source is passed; and
a surface in which the at least one opening portion is formed; and
the optical modulator element further comprising:
an extended portion, which extends from surface of the obliquely displacing member to form a non-zero angle with the surface of the obliquely displacing member, said extended portion corresponding to the opening portion and blocking the light incident on the opening portion, when the obliquely displacing member is displaced.

2. An optical modulator element according to claim 1, wherein the extended portion is angled with respect to an opening plane of the opening portion.

3. An optical modulator element according to claim 2, wherein the extended portion is perpendicular to an opening plane of the opening portion.

4. An optical modulator element according to claim 1, wherein the extended portion comprises a reflecting member.

5. An optical modulator element according to claim 4, further comprising:
a light absorbing portion that absorbs the light reflected by the reflecting member.

6. An optical modulator element according to claim 5, wherein the light absorbing portion is provided on a part of the obliquely displacing member.

7. An optical modulator element according to claim 1, wherein the obliquely displacing member is obliquely displaced by an electrostatic force.

8. An optical modulator element according to claim 1, wherein the obliquely displacing member is obliquely displaced only in a unilateral direction.

9. An optical modulator element according to claim 1, wherein the obliquely displacing member is obliquely displaced in bilateral directions.

10. An image forming apparatus comprising:
an optical modulator element array comprising a plurality of optical modulator elements as set forth in claim 1, said plurality of optical modulators being aligned as an array;
a light source that emits a light to the optical modulator element array; and
a projecting optical system that projects the light emitted from the optical modulator element array onto an image forming plane.

11. An image forming apparatus according to claim 10, wherein each of the plurality of optical modulator element has only one opening portion, and
wherein the image forming apparatus further comprises a microlens array that converges the light from the light source into the opening portion.

12. An image forming apparatus comprising:
an optical modulator element array comprising a plurality of optical modulator elements aligned as a array;
each of said optical modulator elements comprising:
a substrate;
an obliquely displacing member capable of displacing obliquely, the obliquely displacing member being above the substrate and having at least one opening portion through which a light incident on the substrate from a light source is passed; and an extended portion extending from a surface of the obliquely displacing member to correspond to the opening portion and to block the light incident on the opening portion in answer to a displacement of the obliquely displacing member said image forming apparatus further comprising:

a light source that emits a light to the optical modulator element array; and a projecting optical system that projects the light emitted from the optical modulator element array onto an image forming plane.

13. An image forming apparatus according to claim 12, wherein each of the plurality of optical modulator elements has only one opening portion, and the image forming apparatus further comprises:

a microlens array that converges the light from the light source into the opening portion.

* * * * *